United States Patent
Evans, III et al.

(10) Patent No.: US 9,328,841 B2
(45) Date of Patent: May 3, 2016

(54) FLUID DISPENSER UTILIZING DUAL COILS AND METHODS OF FLUID DISPENSING

(71) Applicant: Nordson Corporation, Westlake, OH (US)

(72) Inventors: Howard B. Evans, III, Sugar Hill, GA (US); John M. Riney, Buford, GA (US)

(73) Assignee: Nordson Corporation, Westlake, OH (US)

(*) Notice: Subject to any disclaimer, the term of this patent is extended or adjusted under 35 U.S.C. 154(b) by 43 days.

(21) Appl. No.: 14/479,906

(22) Filed: Sep. 8, 2014

(65) Prior Publication Data
US 2015/0076177 A1   Mar. 19, 2015

Related U.S. Application Data

(60) Provisional application No. 61/878,793, filed on Sep. 17, 2013.

(51) Int. Cl.
| | | |
|---|---|---|
| *B67D 3/00* | (2006.01) | |
| *F16K 31/06* | (2006.01) | |
| *B05C 5/02* | (2006.01) | |
| *F16K 49/00* | (2006.01) | |

(52) U.S. Cl.
CPC ............ *F16K 31/0679* (2013.01); *B05C 5/0225* (2013.01); *F16K 49/005* (2013.01)

(58) Field of Classification Search
CPC .. F16K 31/0679; F16K 49/005; B05C 5/0225
USPC .............. 222/504, 505, 509, 510, 559, 146.2, 222/146.5
See application file for complete search history.

(56) References Cited

U.S. PATENT DOCUMENTS

| | | | | |
|---|---|---|---|---|
| 3,412,971 A | | 11/1968 | McDivitt | |
| 4,681,143 A | * | 7/1987 | Sato | B60G 17/08 |
| | | | | 137/625.37 |
| 4,964,571 A | * | 10/1990 | Taue | F02M 47/027 |
| | | | | 239/124 |
| 5,047,101 A | * | 9/1991 | Trussler | B29C 47/0019 |
| | | | | 156/145 |
| 5,494,219 A | * | 2/1996 | Maley | F02M 59/366 |
| | | | | 239/88 |
| 5,535,919 A | * | 7/1996 | Ganzer | B05C 5/001 |
| | | | | 222/1 |

(Continued)

FOREIGN PATENT DOCUMENTS

| | | |
|---|---|---|
| DE | 3742414 A1 | 6/1989 |
| EP | 2018910 A2 | 1/2009 |

OTHER PUBLICATIONS

European Patent Office, International Search Report and Written Opinion in PCT Application No. PCT/US2014/055146, Jan. 26, 2015.

*Primary Examiner* — Lien Ngo
(74) *Attorney, Agent, or Firm* — Baker & Hostetler LLP

(57) ABSTRACT

A dispenser body having a liquid inlet, a discharge outlet, and a flow channel capable of directing a flow of the hot melt adhesive from the liquid inlet to the discharge outlet. The flow channel includes a valve seat between the liquid inlet and the discharge outlet. The dispensing module further includes a needle having a valve member mounted for movement in the dispenser body between an open position in which the valve member is disengaged with the valve seat allowing liquid flow from the discharge outlet and a closed position in which the valve member is engaged with the valve seat preventing liquid flow from the discharge outlet. A first electromagnetic coil is activated to move the needle to the open position and a second electromagnetic coil is activated to move the needle to the closed position.

15 Claims, 7 Drawing Sheets

(56) References Cited

U.S. PATENT DOCUMENTS 6,231,077 B1 5/2001 Karolek et al.
7,617,955 B2 11/2009 Riney
2012/0258246 A1 10/2012 Saine et al.

* cited by examiner

FLUID DISPENSER UTILIZING DUAL COILS AND METHODS OF FLUID DISPENSING

CROSS-REFERENCE TO RELATED APPLICATION

This application claims the priority of U.S. Provisional Patent Application Ser. No. 61/878,793, filed on Sep. 17, 2013, the disclosure of which is incorporated by reference herein.

TECHNICAL FIELD

The present invention generally relates to liquid dispensing devices used for a variety of purposes, but particularly useful for viscous liquids such as hot melt adhesives, sealing compounds, and the like.

BACKGROUND

A typical dispensing device for supplying liquid, such as hot melt adhesive, generally includes a body having a valve stem that opens and closes a dispensing orifice. The valve stem is usually actuated in at least one direction by pressurized air or an electromagnetic coil to dispense discrete amounts of pressurized liquid. A return mechanism, such as a spring mechanism, is used to move the valve stem in an opposite direction against a valve seat. This stops the flow of liquid from the dispensing orifice. Such typical return mechanisms, and particularly spring mechanisms, apply a resistance against the opening force. The force or resistance of the return mechanism slows down the speed of the valve stem and thus increases the time of opening, thus reducing the amount of cycles possible with a particular system. Electromagnetic coils have been utilized to actuate the valve stem in only one direction, with a spring return in the other direction. However, such configurations are limited in terms of actuation speed due to the potential of overheating of the coils.

Despite the wide success of devices as described above, it would be desirable to provide a methods and devices that address these issues.

SUMMARY

In accordance with one embodiment, a dispensing module includes a dispenser body having a liquid inlet, a discharge outlet, and a flow channel capable of directing a flow of the liquid from the liquid inlet to the discharge outlet. The flow channel includes a valve seat between the liquid inlet and the discharge outlet. The dispensing module further includes a needle having a valve member mounted for reciprocating movement between open and closed positions. The dispensing module further includes an actuator operatively coupled to the needle. The actuator is capable of actuating the needle between the open and closed positions to selectively dispense hot melt adhesive from the discharge outlet. The actuator further includes an armature coupled with the needle and first and second electromagnetic coils positioned proximate to said armature. The first electromagnetic coil is activated to move the needle to the open position and the second electromagnetic coil is activated to move the needle to the closed position.

A method of dispensing liquid is also provided and generally includes directing a liquid into a liquid inlet communicating with a discharge outlet and a flow channel. The flow channel is capable of directing a flow of the liquid from the liquid inlet to the discharge outlet, and includes a valve seat between the liquid inlet and the discharge outlet. The method further comprises operating an actuator to move a needle having a valve member between an open position in which the valve member is disengaged with the valve seat allowing liquid to flow from the discharge outlet, and a closed position in which the valve member is engaged with the valve seat preventing liquid flow from the discharge outlet. The actuator includes an armature coupled with the needle and first and second electromagnetic coils positioned proximate to the armature. The method further includes activating the first electromagnetic coil to move the needle to the open position and activating the second electromagnetic coil to move the needle to the closed position.

Various additional objectives, advantages, and features of the invention will be appreciated from a review of the following detailed description of the illustrative embodiments taken in conjunction with the accompanying drawings.

DETAILED DESCRIPTION OF THE ILLUSTRATIVE EMBODIMENTS

Figure 1:
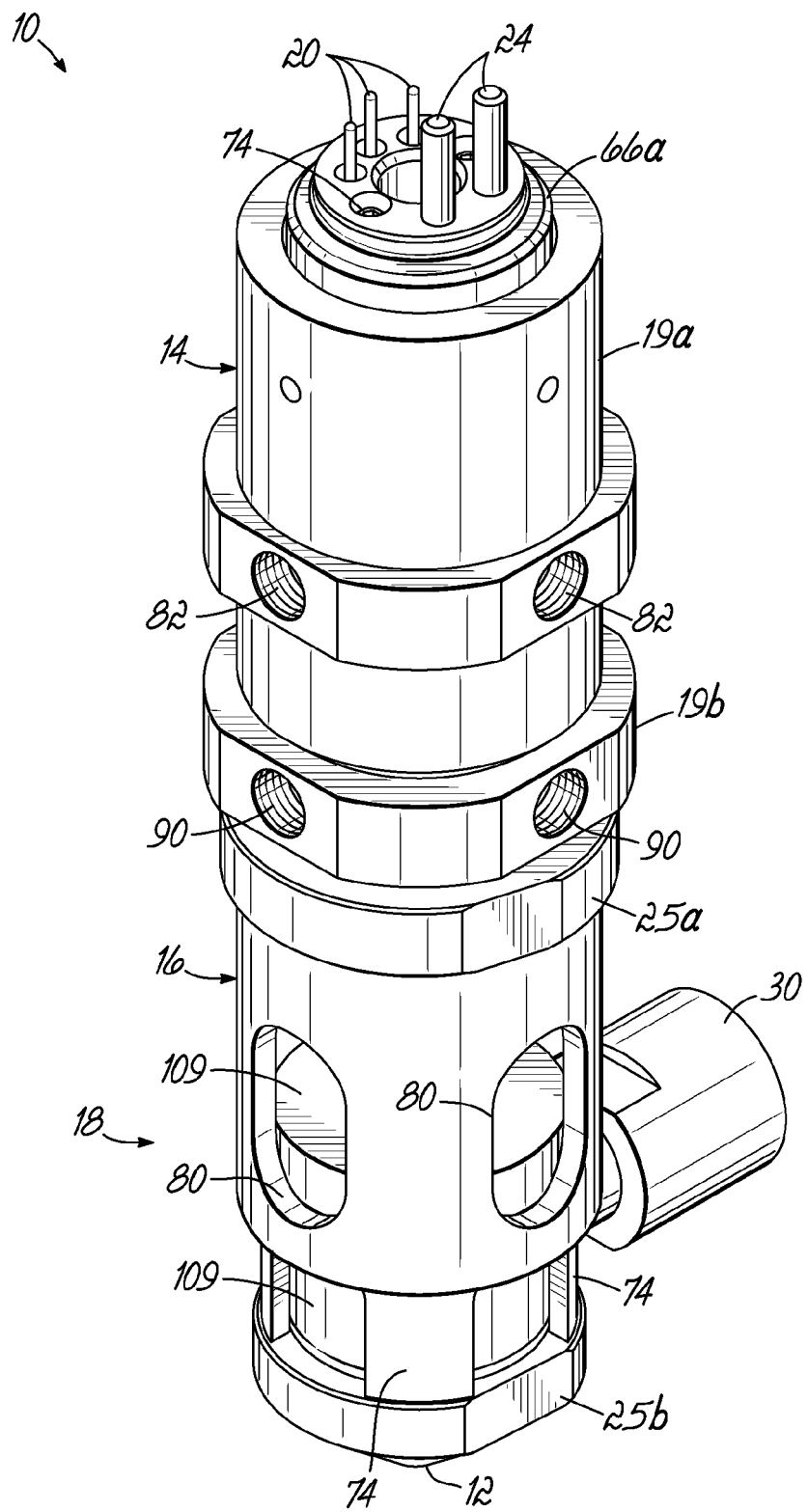
FIG. 1 illustrates a perspective view of an exemplary liquid dispensing module.

FIGS. 1, 2A, 2B, 3A and 3B depict an exemplary dispensing module 10 in accordance with one embodiment of the present invention. The exterior appearance of the module 10 resembles a conventional dispensing module in that it includes a dispensing nozzle 12 from which adhesive or other liquid is dispensed. The dispensing nozzle 12 may be adapted for connecting the module 10 to a gun manifold, or body (not shown). The module 10 generally includes an actuator 14, a spacer member 16, and a dispensing portion 18. In order to cool down the actuator 14, first and second cooling jackets 19a, 19b essentially envelop the actuator 14 and include features that allow the use of fluids to cool the actuator 14 and its components. The module includes leads 20 which may be connected to a source of electricity and/or a controller 22 for controlling the actuator 14, which will be described in more detail below. The module 10 also includes optional positioner rods 24 which may allow the module 10 to be placed relative to any type of holder. The module 10 also includes support rings 25a, 25b which provide a mechanism for coupling components of the module 10 together as will be described below.

The dispensing portion 18 has a liquid inlet 28 including a liquid inlet port 30, a discharge outlet 32, and a flow channel 34 between the liquid inlet 28 and the discharge outlet 32. The discharge outlet 32 is capable of directing a flow of the liquid. The flow channel 34 includes a valve seat 36 near the discharge outlet 32. A valve stem or needle 38 is mounted in dispensing portion 18 for reciprocating motion therein. The needle 38 includes a valve member, such as ball 40, which cooperates with valve seat 36 to selectively dispense liquid from module 10. The valve member may alternatively comprise the end of the needle 38 such that the valve member is integral with the needle 38. In such an embodiment, the valve member may be tapered to conform to at least a portion of the valve seat 36. In particular, the needle 38 reciprocates between an open and closed position. In the open position (FIGS. 2B and 3B), ball 40 is disengaged from the valve seat 36 so that a gap is formed between the ball 40 and the valve seat 36 that allows liquid to be dispensed from dispensing outlet 20. In the closed position (FIG. 2A), ball 40 is engaged with the valve seat 36 so as to prevent any liquid from being dispensed from the discharge outlet 32. Movement of the needle 38 between the open and closed position then controls the dispensing of liquid from module 10.

The dispensing module 10 further includes a needle guide 42, coupled to the dispensing portion 18. The needle guide 42 maintains the needle 38 vertically aligned within the dispensing portion 18 so that, for example, the ball 40 and valve seat 36 properly engage in the closed position. The needle guide 42 is generally cylindrical and includes a main body portion 44 and a cylindrical extension portion 46 above the main body portion 44. The needle guide 42 does not move relative to the dispensing portion 18 and therefore a static seal, such as o-ring 48, is used to seal the needle guide 42 from the dispensing portion 18 along the main body portion 44. Main body portion 44 and extension portion 46 include a needle passageway 50 receiving a portion of the needle 38 therethrough. The needle 38 moves relative to the needle guide 42 as it reciprocates between the open and closed positions.

Liquid in flow channel 34 is typically under pressure and will undesirably migrate, or leak, out of the flow channel 34 unless a seal is provided. To this end, a flexible seal 52 is provided and flexes with movement of needle 38. The flexible seal 52 includes a seal body having a first end 54, a second end 56, and a central portion 58 between the first and second ends 54, 56. The first and second ends 54, 56 have openings 60, 62, respectively, and the seal body has a passageway 63 extending between the first and second openings 60, 62 so that the needle 38 may pass through the seal 52. The central portion 58 of the seal 52 generally flares radially outward away from needle 38. More specifically, central portion 58 may be bulbous as shown in the illustrative embodiment. Accordingly, an annular cavity 64 is formed between the central portion 58 of the seal 52 and the nearby portion of the needle 38. The flexible seal 52 may be made from any of a variety of available elastomers or plastics, such as, for example, the fluoroelastomer marketed as Viton®. Further details regarding the flexible seal 52 are found in U.S. Pat. No. 7,617,955 (assigned to Nordson Corporation, Westlake, Ohio), which is incorporated herein by reference, in its entirety. However, it will be appreciated that seal 52 is merely illustrative and other seal(s) may be used instead.

Figure 2A:
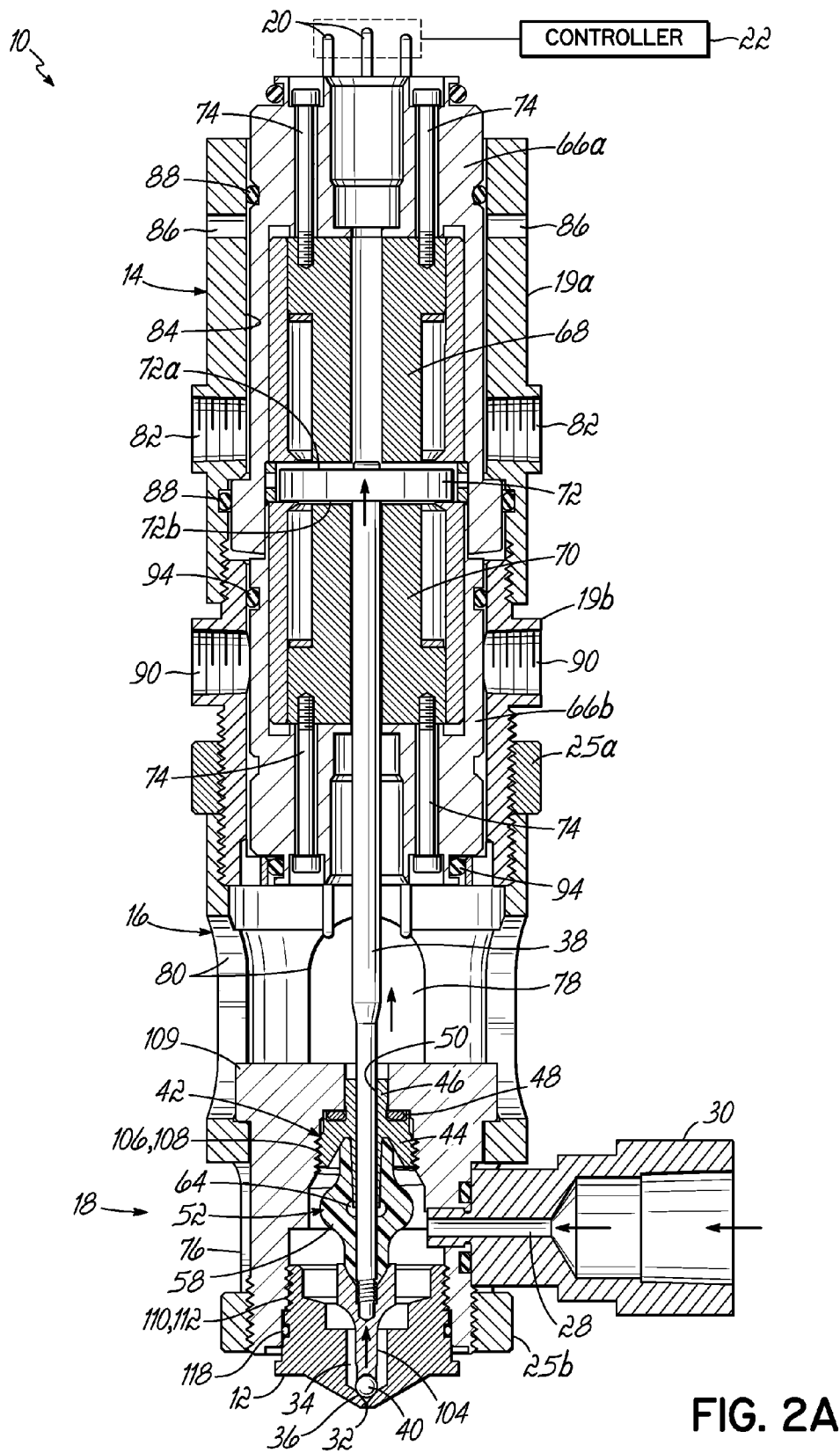
FIG. 2A illustrates a sectional view of the exemplary liquid dispensing module of FIG. 1, showing the needle in a closed position.
Figure 2B:
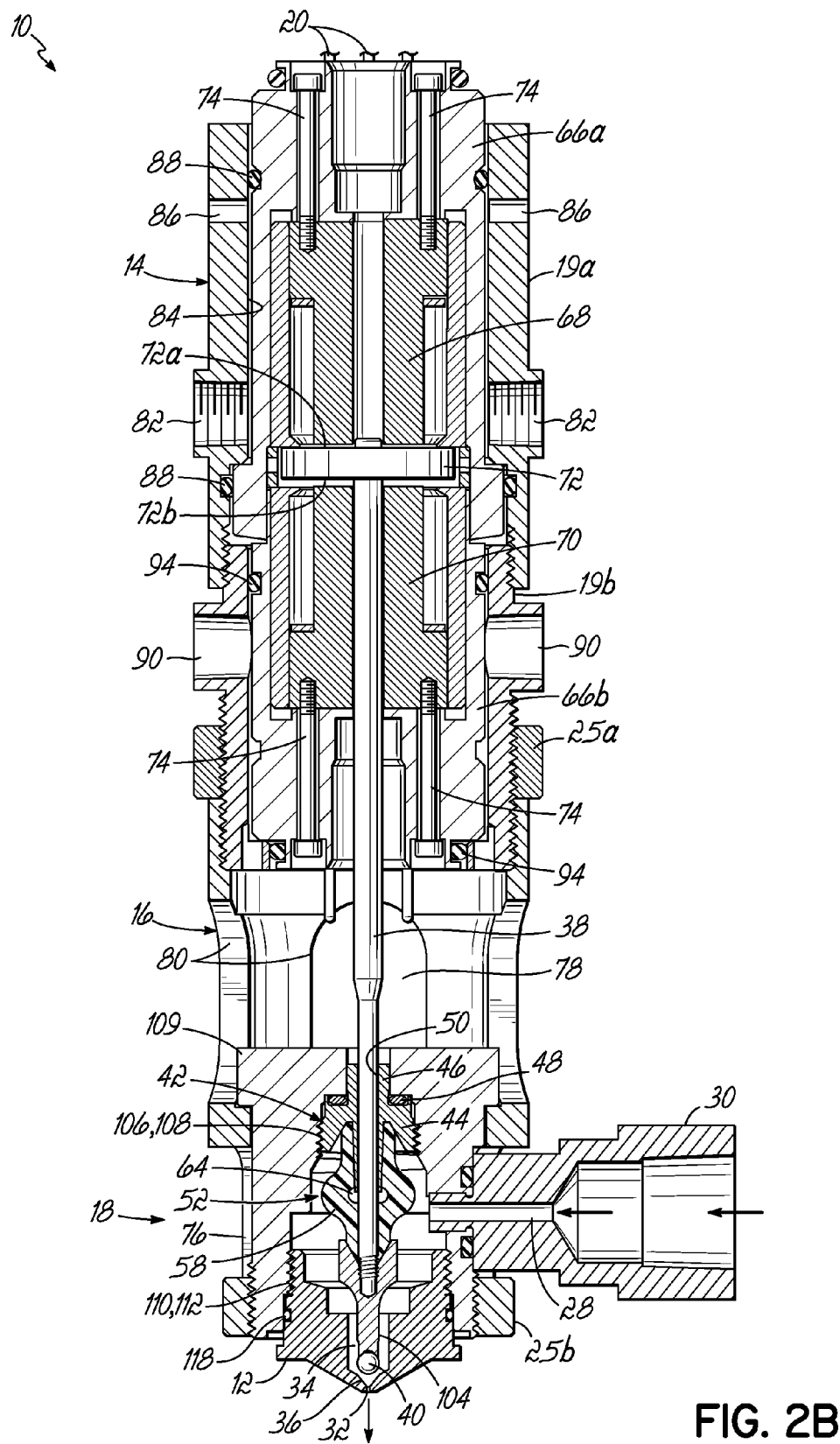
FIG. 2B illustrates a sectional view of the exemplary liquid dispensing module of FIG. 1, showing the needle in an open position.
Figure 3A:
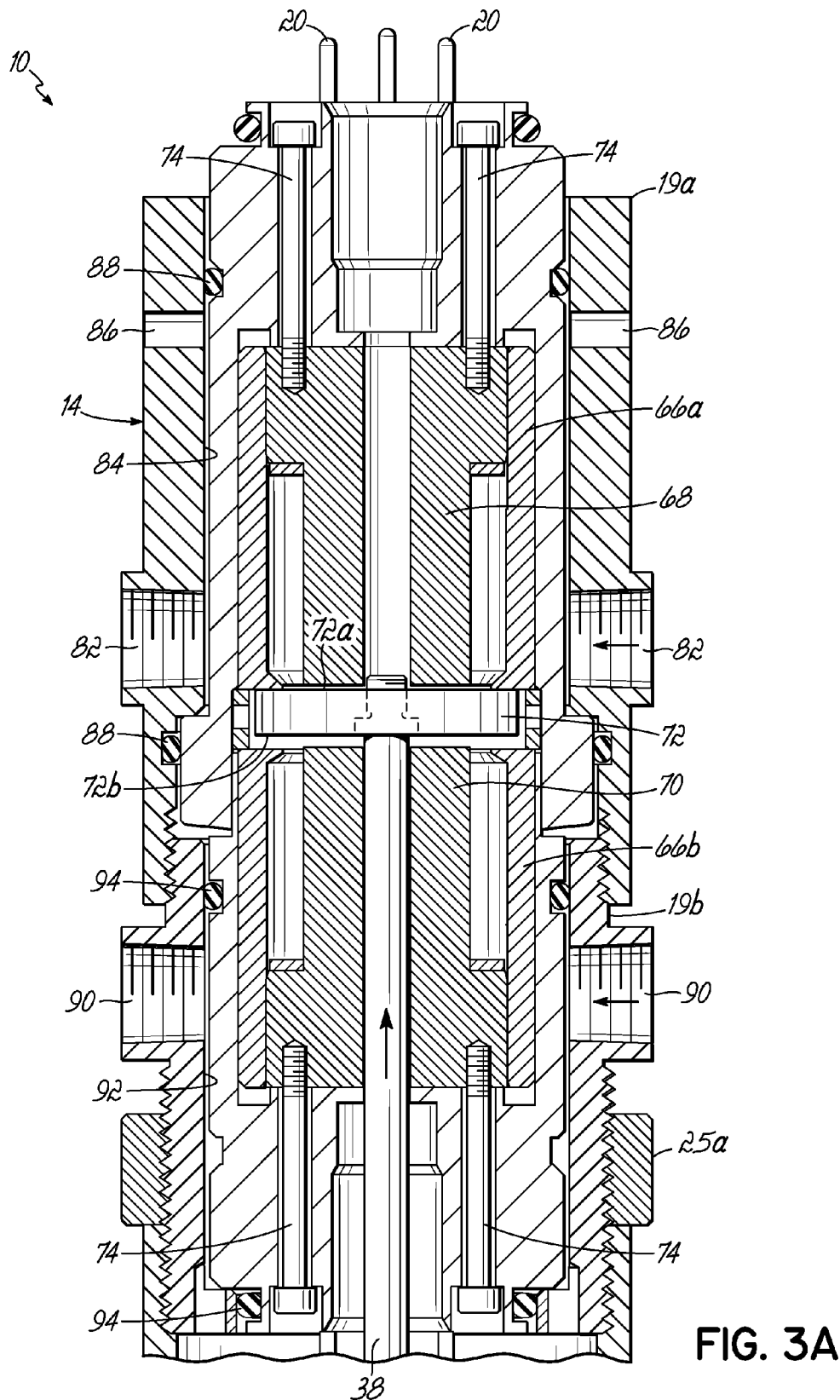
FIG. 3A illustrates a sectional view of the exemplary liquid dispensing module of FIG. 2B, showing actuation portions of the module in more detail.
Figure 3B:
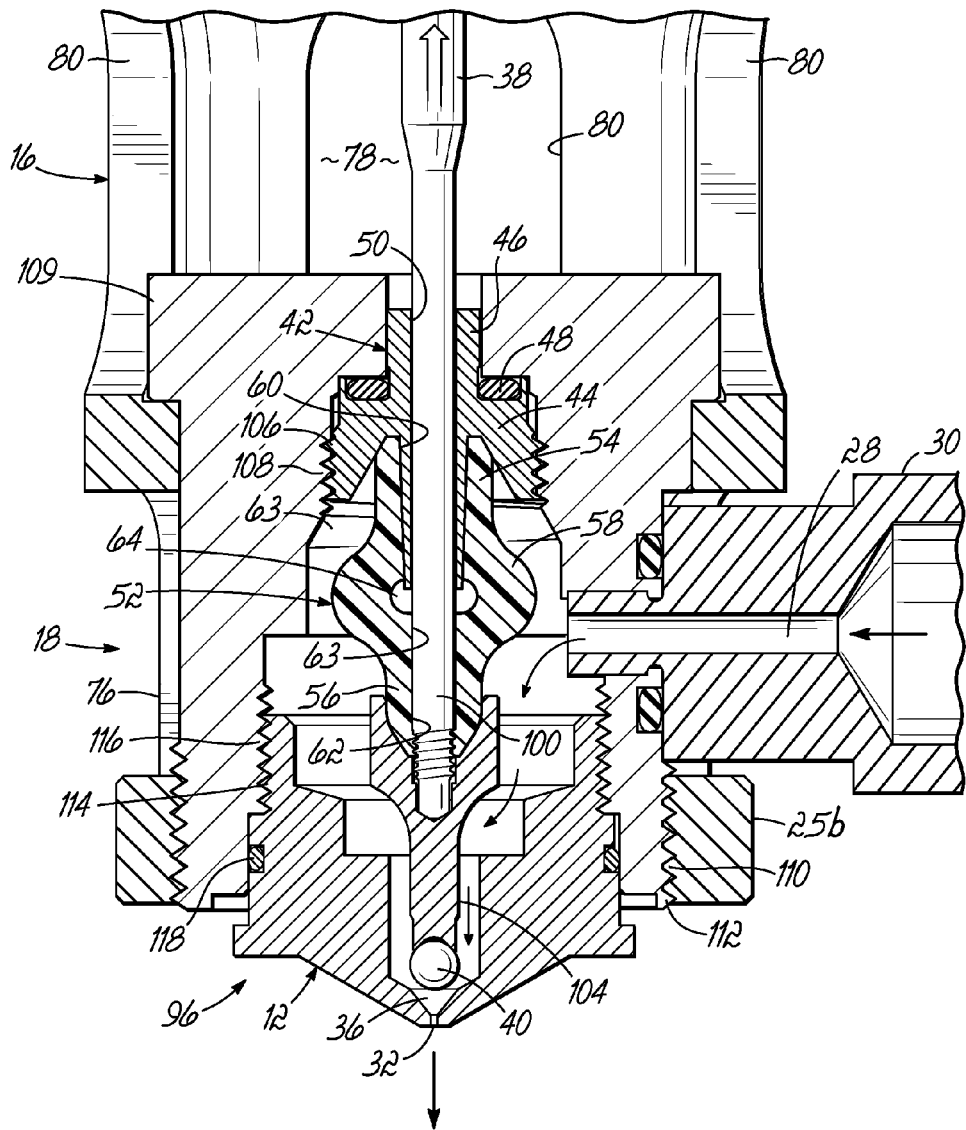
FIG. 3B illustrates a sectional view of the exemplary liquid dispensing module of FIG. 2B, showing dispensing portions of the module in more detail.

Referring more specifically to FIG. 3A in conjunction with FIGS. 2A and 2B, the actuator 14 is operatively coupled to needle 38 and moves the needle 38 between the open position and closed position so as to selectively dispense liquid from discharge outlet 32. The actuator 14 includes an actuator housing having upper and lower portions 66a, 66b containing first and second electromagnetic coils 68, 70, respectively. Actuator 14 further includes an armature 72. The armature 72 comprises a disc-shaped member and is fixedly coupled to needle 38 and, therefore, moves with needle 38 between the open and closed positions. The armature 72 may be formed from any magnetizeable material that is attracted to, or repelled from, a magnet, as will be understood by those skilled in the art. Moreover, the armature 72 may be in a shape other than the generally cylindrical disc-shape shown. In this embodiment, the armature 72 is formed of stainless steel having Chrome Core (12-FM). Persons skilled in the art will recognize that the armature may be formed of different magnetizeable materials.

The positions of the first and second electromagnetic coils 68, 70 are maintained relative to the actuator housing 66a, 66b by a plurality of fasteners 74. The first and second electromagnetic coils 68, 70 are positioned relative to the armature 72 such that the armature 72 is between the first and second electromagnetic coils 68, 70. In one embodiment, the first and second electromagnetic coils 68, 70 are solenoid coils. However, the electromagnetic coils may be other types of electromagnetic coils. In order to move the armature 72, and thus the needle 38, the first and second electromagnetic coils 68, 70 are selectively activated in order to attract the armature 72 towards, or repel the armature 72 from, the coils 68, 70. As used herein, "activated" means that the electromagnetic coils are energized or magnetized such that the armature 72 is attracted to (or repelled from) the respective electromagnetic coil. The first electromagnetic coil 68 is activated to move the armature 72 to a position such that the needle 38 is in the open position. The second electromagnetic coil 70 is activated to move the armature 72 to a position such that the needle 38 is in the closed position. Alternatively, the first and second electromagnetic coils 68, 70 may operate in a manner such that activating the first electromagnetic coil 68 moves the needle 38 to the closed position and activating the second coil moves the needle 38 to the open position. In one embodiment, the needle 38 is configured to move in a reciprocating manner. However, in other embodiments, the needle 38 may be configured to move in a rotational, pivoting, or other manner which allows engagement and disengagement of a valve member from a valve seat.

The armature 72 is situated such that when the needle 38 is in the open position (FIGS. 2B and 3B), the upper surface 72a of armature 72 is spaced from the first electromagnetic coil 68 by an amount as to prevent the armature 72 from making contact with the first electromagnetic coil 68, and thus to prevent a permanent or semi-permanent magnetic coupling therebetween. When the needle 38 is in the open position, the space between the upper surface 72a of the armature 72 and the first coil 68 is approximately 0.002", while the space between the bottom surface 72b of the armature 72 and the second coil is approximately 0.010". Therefore, it will be appreciated that the stroke of the module 10 described herein is approximately 0.008". Similarly, when the needle 38 is in the closed position (FIG. 2A), the armature 72 is spaced from the second electromagnetic coil 70 by an amount as to prevent the armature 72 from making contact with the second electromagnetic coil 70. When the needle 38 is in the second position, the space between the bottom surface 72b of the armature 72 and the second coil 70 is approximately 0.002". It will be appreciated that the spaces between the coils 68, 70 and the armature 72 shown in the figures may be exaggerated for illustration purposes and may not be to scale. Moreover, it will be appreciated that the length of the stroke of the module 10, and the space and/or distance between the coils 68, 70 and the armature 72 at the end of the stroke, may differ. The length of the stroke of the module 10 and distances between the coils 68, 70 and the armature 72 at the end of the stroke, as disclosed herein, may be altered by changing the strength of the coils 68, 70. This can be accomplished by altering the characteristics and/or dimensions of the coils 68, 70, such as the diameter, height, or other dimensions thereof. Alternatively, or additionally, the strength of the coils may be changed by increasing or decreasing the amount of energy applied to the coils.

The controller 22 is used to generate signals (FIG. 5), such as electrical signals, which activate the first and second coils 68, 70 such that the first and second coils 68, 70 operate approximately 180 degrees out of phase. As described herein, "approximately 180 degrees out of phase" is meant to cover a range between approximately 160 degrees out of phase and approximately 200 degrees out of phase. In this manner, by operating approximately 180 degrees out of phase, the attractive (or repelling) forces from each of the coils 68, 70 will not cancel each other out by being activated at the same time. However, it will be understood that when operating approximately 180 degrees out of phase, each of the coils 68,70 may be activated simultaneously for a short period of time (note the overlap of signals, as measured by current, shown in FIG. 5).

During operation, a first set of signals 71a is generated by the controller 22 which activates the first electromagnetic coil 68, thereby attracting armature 72 toward the first electromagnetic coil 68 and moving the needle 38 to the open position. Similarly, a second set of signals 71b is generated by the controller 22 which activates the second electromagnetic coil 70, thereby attracting armature 72 toward the second electromagnetic coil 70 and moving the needle 38 to the closed position. Either set of signals may be only one signal that is sent from the controller 22 to the respective electromagnetic coil. Alternatively, either set of signals may be more than one signal. For example, an initial signal of one type may be generated by the controller 22, which then may be transformed or converted into multiple signals of the same type, or transformed or changed to another type of signal that is configured to activate the coils 68, 70. In other words, the signal or set of signals may directly activate or indirectly activate the coils 68, 70. In one embodiment, the signal(s) may be generated at a constant amount, such as an approximately 24-volt signal. In other embodiments, however, the voltage generated may be varied in order to control the current of the signal(s).

Figure 5:
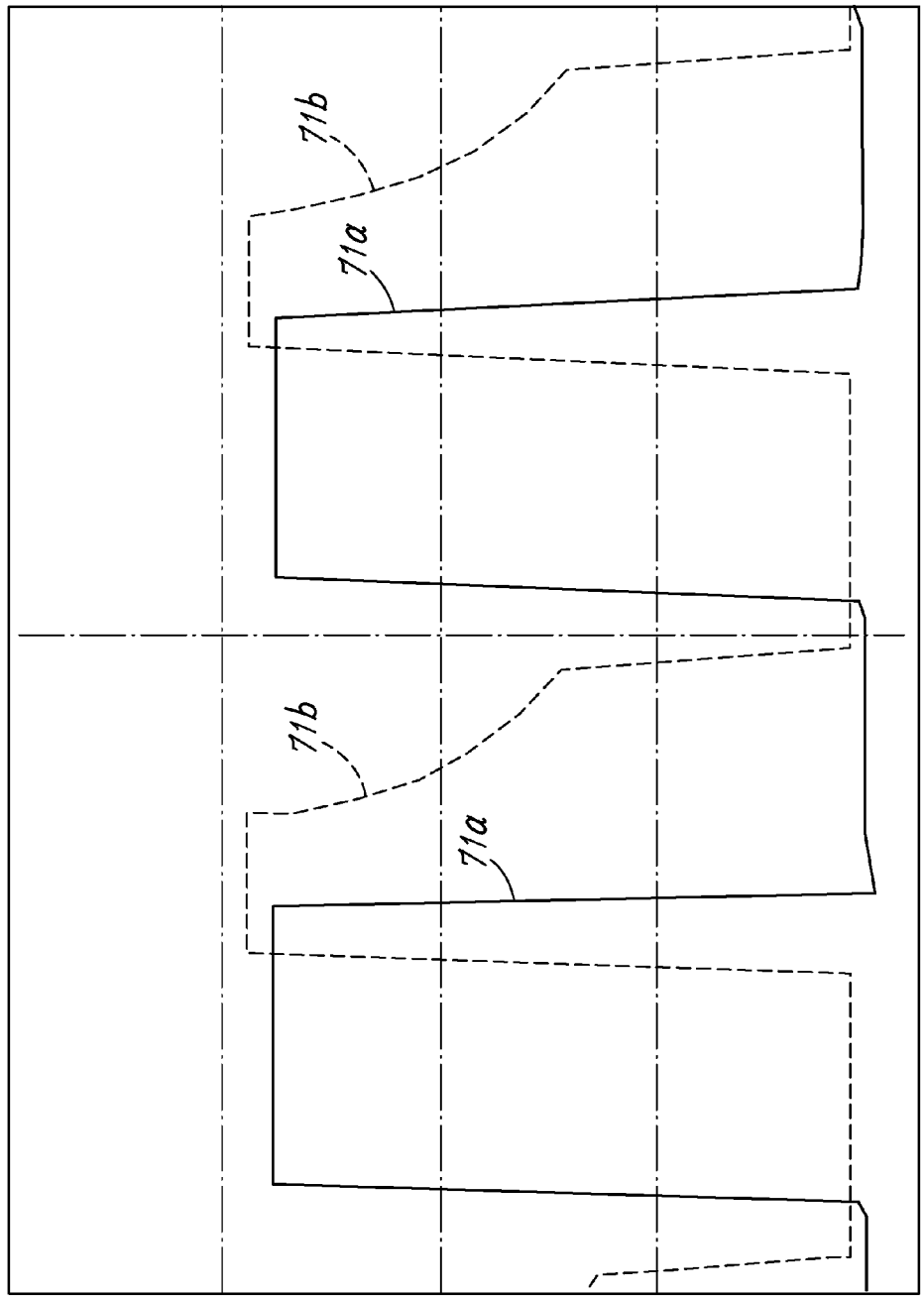
FIG. 5 is a graphical representation of sets of signals generated by a controller to activate the actuator.

Still referring to FIG. 5, the controller 22 may be configured to send the first and second sets of signals 71a, 71b in an overlapping manner. The first set of signals 71a is sent in order to activate the first electromagnetic coil 68. Similarly, the second set of signals 71b is sent in order to activate the second electromagnetic coil 70. The controller 22 sends the first set of signals 71a before the needle 38 has reached the closed position, and may also send the second set of signals 71b before the needle 38 has reached the open position, such that a period of overlap is created where both sets of signals 71a, 71b are being sent simultaneously. Such a configuration prevents a delay in movement of the needle member 38 due to the time difference between when the controller 22 sends the signal(s) and when the proper coil 68 or 70 is activated, thereby increasing the potential number of dispensing cycles possible. Sending the signal(s) in such a manner still allows the first and second electromagnetic coils 68, 70 to operate in a desired manner, such as 180 degrees out of phase, as disclosed above.

Referring back to FIGS. 1, 2A, 2B, and 3B, the electromagnetic coils 68, 70 may generate a substantial amount of heat during operation, which may lead to overheating of the coils 68, 70 and surrounding components. Further, heat from the dispensing portion 18, which is maintained at a hot melt temperature, may also contribute to overheating of the electromagnetic coils 68, 70. To prevent overheating of the electromagnetic coils 68, 70, the module 10 includes a thermal spacer member 16 between the actuator 14 and the dispensing portion 18. The spacer member 16 isolates the actuator 14 from the dispensing portion 18 and therefore isolates the heat generated by the actuator 14 from the dispensing portion 18. Isolating the dispensing portion 18 prevents the residual heat of the actuator from altering the temperature of the hot melt adhesive, which alters its viscosity in an unwanted manner and thus negatively affects the consistency of dispensing. Such a configuration allows the dispensing portion 18 to be maintained at hot melt temperatures of up to approximately 350° F. The spacer member 16 is a generally hollow cylindrical member with legs 76 that, when the module 10 is assembled, rest on annular support ring 76. The spacer member 16 includes a cavity 78 and apertures 80 providing access to the cavity 78. The cavity 78 and apertures 80 provide an area through which air or other fluids may flow in order to cool down at least the second electromagnetic coil 70. At least a portion of the needle 38 traverses the cavity 78.

The module 10 also includes cooling jackets 19a, 19b to cool the actuator 14, and more specifically, the electromagnetic coils 68, 70. As best seen in FIGS. 2A, 2B, and 3A, the first cooling jacket 19a is generally adjacent the first electromagnetic coil 68 and includes access ports 82 communicating with a cavity 86 in between the first cooling jacket 19a and actuator housing 66a. The access port 82 may be coupled with a gas or air dispensing system for directing air into the access ports 82, into the cavity 84, and out of outlet 86. As described herein, the access ports 82, outlet 86, and cavity 84, alone or in combination, may be referred to as a vent which allows cooling gas/air to travel along a portion of the actuator housing 66a to thereby cool the actuator 14. Similarly, the second cooling jacket 19b includes access ports 90 in communication with a second cavity 92 between the second cooling jacket 19b and actuator housing 66b. As with the first cooling jacket 19a, cooling gas may be directed into the access port 90 in order to lower the temperature of the second electromagnetic coil 70 and other parts of the actuator 14. The access ports 90 and cavity 92 alone or in combination may be referred to as a vent which allows air to travel along a portion of the actuator housing 66b to thereby cool the actuator 14. Similar to the first cavity 84, a plurality of o-rings 94 is provided order to prevent the undesired leakage of fluid from the cavity 92 into the ambient environment or into the actuator housing 66b.

Alternatively, a cooling system for directing liquid, including water or other coolants, into the cooling jackets 19a, 19b could be coupled with the access ports 82, 90 and the outlet 86 to create a closed loop system. Such a cooling system would allow liquids, such as water, to be circulated past the actuator 14 in the vents described above, out of the access ports 82, 90, and through an externally circulating system (of tubes, for example) (not shown) connected thereto. In order to cool the cooling liquid after passing through the vents, the external circulating system may include a cooling device.

Figure 4:
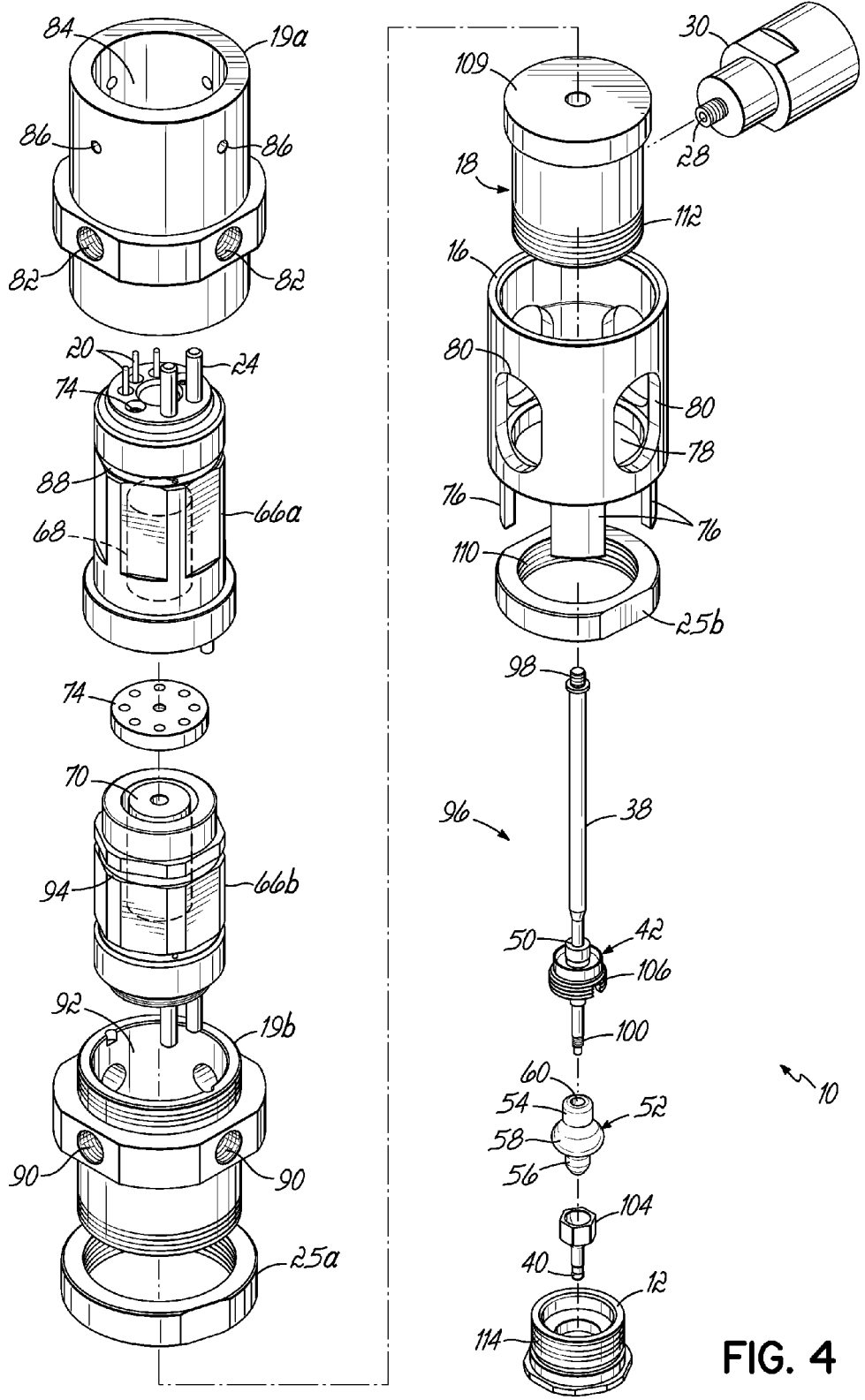
FIG. 4 illustrates a disassembled perspective view of the components of the liquid dispensing module of FIG. 1.

In order to prevent the undesired leakage of fluid from the cavity 84 into the ambient environment or into the actuator housing 66a, a plurality of o-rings 88 is provided. Turning again to FIG. 4, needle 38, needle guide 42, and seal 52 comprise a needle and seal assembly. A first end 98 of the needle 38 threadably engages with the armature 72. A second end portion 100 of the needle 38 traverses through the passageway 63 of the seal member 52 and threadably engages with the ball assembly 104, which has the ball 40 on the distal end thereof. Needle guide 42 includes outer threads 106 which mate with an inner threaded portion 108 (FIG. 3B) of a dispenser member 109. O-ring 48 prevents leakage between the needle guide 42 and the cavity 78 of the spacer member 16. Support ring 25b includes inner threads 110 which engage the outer threads 112 of dispenser member 109. An outer threaded portion 114 of the dispensing nozzle 12 couples with an inner threaded portion 116 of the dispenser member 109 to fix the dispensing nozzle 12 in place, and an o-ring 118 (FIGS. 2A and 3B) prevents leakage therebetween.

While the present invention has been illustrated by the description of specific embodiments thereof, and while the embodiments have been described in considerable detail, it is not intended to restrict or in any way limit the scope of the appended claims to such detail. The various features discussed herein may be used alone or in any combination. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of the general inventive concept.

What is claimed is:

1. A dispensing module for dispensing a liquid, the module comprising:
   a dispenser body having a liquid inlet, a discharge outlet, a flow channel directing a flow of the liquid from said liquid inlet to said discharge outlet, and a valve seat within said flow channel between said liquid inlet and said discharge outlet;
   a needle having a valve member mounted for movement in said dispenser body between an open position in which said valve member is disengaged with said valve seat allowing hot melt adhesive flow from said discharge outlet, and a closed position in which said valve member is engaged with said valve seat preventing liquid flow from said discharge outlet;
   an actuator housing having an actuator operatively coupled to said needle, said actuator configured to actuate said needle between the open and closed positions to selectively dispense hot melt adhesive from said discharge outlet, said actuator further comprising an armature coupled with said needle and first and second electromagnetic coils positioned proximate to said armature, wherein said first electromagnetic coil is activated to move said needle to the open position and said second electromagnetic coil is activated to move said needle to the closed position; and
   a spacer member between said dispenser body and actuator housing defining a thermal barrier therebetween, wherein said spacer member includes a cavity and at least one aperture communicating with said cavity and opening to an exterior of said dispensing module, and wherein a portion of said needle traverses through said cavity.

2. The module of claim 1, wherein the first and second electromagnetic coils are configured to operate approximately 180 degrees out of phase.

3. The module of claim 1, wherein said first and second electromagnetic coils further comprise solenoid coils.

4. The module of claim 1, wherein the needle is configured to move in a reciprocating manner.

5. A dispensing module for dispensing a liquid, the module comprising:
   a dispenser body having a liquid inlet, a discharge outlet, a flow channel directing a flow of the liquid from said liquid inlet to said discharge outlet, and a valve seat within said flow channel between said liquid inlet and said discharge outlet;
   a needle having a valve member mounted for movement in said dispenser body between an open position in which said valve member is disengaged with said valve seat allowing hot melt adhesive flow from said discharge outlet, and a closed position in which said valve member is engaged with said valve seat preventing liquid flow from said discharge outlet;
   an actuator housing having an actuator operatively coupled to said needle, said actuator configured to actuate said needle between the open and closed positions to selectively dispense hot melt adhesive from said discharge outlet, said actuator further comprising an armature coupled with said needle and first and second electromagnetic coils positioned proximate to said armature, wherein said first electromagnetic coil is activated to move said needle to the open position and said second electromagnetic coil is activated to move said needle to the closed position; and
   a jacket enveloping at least a portion of said actuator to thereby define a cavity between said jacket and said actuator, said cavity adapted to receive a fluid for cooling said actuator.

6. A system for dispensing a fluid, comprising:
   the liquid dispensing module of claim 1; and
   a controller configured to generate at least one signal to activate said first and second electromagnetic coils, respectively.

7. A method of dispensing liquid, the method comprising:
   directing a liquid into a liquid inlet communicating with a discharge outlet and a flow channel, the flow channel directing a flow of the liquid from the liquid inlet to the discharge outlet, and a valve seat being within said flow channel between the liquid inlet and the discharge outlet; and
   operating an actuator, disposed at least partially within an actuator housing, to move a needle having a valve member between an open position in which the valve member is disengaged with the valve seat allowing liquid to flow from said discharge outlet, and a closed position in which said valve member is engaged with said valve seat preventing liquid flow from said discharge outlet, the actuator having an armature coupled with the needle and first and second electromagnetic coils positioned proximate to the armature,
   wherein a portion of said needle moves through a cavity of a spacer member disposed between, and defining a thermal barrier therebetween, said actuator housing and a dispenser body containing said flow channel, the spacer member further including at least one aperture communicating with said cavity and opening to an exterior of a dispensing module including said actuator housing and dispensing body, and
   wherein operating the actuator further comprises activating the first electromagnetic coil to move the needle to the open position and activating the second electromagnetic coil to move the needle to the closed position.

8. The method of claim 7, wherein activating the first or second electromagnetic coil includes generating at least one signal with a controller.

9. The method of claim 7, wherein the first and second electromagnetic coils are activated such that they operate approximately 180 degrees out of phase.

10. The method of claim 7, further comprising:
   generating a signal to move the needle from the open position to the closed position before the needle is in the open position.

11. The method of claim 7, further comprising:
generating a signal to move the needle from the closed position to the open position before the needle is in the closed position.

12. The method of claim 7, further comprising:
directing a fluid into a cavity between the actuator and a jacket surrounding at least part of the actuator, in order to cool the actuator.

13. The method of claim 7, wherein activating one of the first or second electromagnetic coils attracts the armature towards the activated coil.

14. The method of claim 7, wherein activating one of the first or second electromagnetic coils repels the armature from the activated coil.

15. The method of claim 7, wherein the needle moves in a reciprocating manner.

* * * * *